United States Patent
Von Gaisberg-Helfenberg et al.

(10) Patent No.: US 10,801,376 B2
(45) Date of Patent: Oct. 13, 2020

(54) VALVE TRAIN DEVICE

(71) Applicant: Daimler AG, Stuttgart (DE)

(72) Inventors: Alexander Von Gaisberg-Helfenberg, Beilstein (DE); Thomas Stolk, Kirchheim (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 16/344,713

(22) PCT Filed: Aug. 31, 2017

(86) PCT No.: PCT/EP2017/001035
§ 371 (c)(1),
(2) Date: Apr. 24, 2019

(87) PCT Pub. No.: WO2018/077451
PCT Pub. Date: May 3, 2018

(65) Prior Publication Data
US 2019/0338684 A1    Nov. 7, 2019

(30) Foreign Application Priority Data

Oct. 29, 2016   (DE) ........................ 10 2016 012 967

(51) Int. Cl.
*F01L 13/00* (2006.01)
*F16H 53/04* (2006.01)

(52) U.S. Cl.
CPC .......... *F01L 13/0042* (2013.01); *F16H 53/04* (2013.01); *F01L 2013/0078* (2013.01)

(58) Field of Classification Search
CPC .......... F01L 13/0042; F01L 2013/0078; F01L 2001/0473; F01L 1/053; F01L 1/46; F01L 2013/0052; F01L 2013/103; F01L 2820/032

USPC .................. 123/90.16, 90.18, 90.6
See application file for complete search history.

(56) References Cited

U.S. PATENT DOCUMENTS

| | | | |
|---|---|---|---|
| 8,291,877 B2* | 10/2012 | Meintschel | F01L 1/053 123/90.18 |
| 2012/0204824 A1* | 8/2012 | Kamichika | F01L 1/047 123/90.15 |

FOREIGN PATENT DOCUMENTS

| | | | |
|---|---|---|---|
| DE | 196 11 641 C1 | 6/1997 | |
| DE | 102013203745 A1 * | 9/2013 | .......... F01L 13/0042 |
| DE | 10 2012 220 566 A1 | 5/2014 | |
| JP | 2-11812 A | 1/1990 | |
| JP | 2011-226422 A | 11/2011 | |
| JP | 2015-214937 A | 12/2015 | |

OTHER PUBLICATIONS

PCT/EP2017/001035, International Search Report dated Dec. 1, 2017 (Two (2) pages).

* cited by examiner

*Primary Examiner* — Jorge L Leon, Jr.
(74) *Attorney, Agent, or Firm* — Crowell & Moring LLP

(57) ABSTRACT

A valve train device, particularly for an internal combustion engine, includes a camshaft, a cam element able to be displaced axially on the camshaft, and a mechanical displacement element which is provided on the camshaft for the purpose of axially displacing the cam element. The mechanical displacement element is provided to move the cam element by interaction with only a single contour of the cam element in a first and a second axial direction.

8 Claims, 3 Drawing Sheets

VALVE TRAIN DEVICE

BACKGROUND AND SUMMARY OF THE INVENTION

The invention relates to a valve train device and a method for operating a valve train device.

A valve train device, in particular for an internal combustion engine, comprising at least one camshaft and at least one cam element that can be axially displaced on the camshaft, and comprising at least one mechanical displacement element that is provided for axially displacing the cam element on the camshaft, is already known from DE 196 11 641 C1.

The problem addressed by the invention is in particular to provide a valve train device which particularly advantageously requires little axial installation space and which can also in particular be lighter and more cost-effective.

The invention is based on a valve train device, in particular for an internal combustion engine, comprising at least one camshaft and at least one cam element that can be axially displaced on the camshaft, and comprising at least one mechanical displacement element that is provided for axially displacing the cam element on the camshaft.

It is proposed that the at least one mechanical displacement element is provided to move the cam element in a first and a second axial direction by interacting with just one single contour of the cam element. As a result, a second contour for shifting the cam element in a second axial direction can advantageously be omitted, and just one switching unit can be used in particular to shift the cam element in the two axial directions. As a result, the valve train device can be designed so as to be particularly space-saving in particular in the axial direction and cost-effective. An "internal combustion engine" is in this case understood in particular to mean a propulsion system of a motor and/or commercial vehicle, which system provides driving power for driving the corresponding motor and/or commercial vehicle by combusting a fuel, such as petrol or diesel. A "camshaft" is in this case understood in particular to mean a shaft which is provided for actuating a plurality of valves of an internal combustion engine and which has in each case at least one cam track for actuating a valve. In this case it is also conceivable for the camshaft to be designed as an intake camshaft and be provided for actuating intake valves, and also for the camshaft to be designed as an outlet camshaft and be provided for actuating outlet valves. In principle it would also be conceivable for the camshaft to be provided for actuating intake valves and for actuating outlet valves. A "cam track" is understood in particular to mean a region extending on a circumference of the camshaft, preferably on a circumference of a cam element, which region forms a valve actuating cam for valve actuation and/or defines the valve actuation. A "cam element" is understood in particular to mean an element which is arranged on a camshaft for conjoint rotation and preferably so as to be axially displaceable and which, in order to actuate a valve, is provided to directly or indirectly supply the corresponding valve with at least one valve stroke. "Provided" is understood in particular to mean specially designed, equipped and/or arranged. A "cam track" is understood in particular to mean a region extending on a circumference of the camshaft, preferably on a circumference of a cam element, which region forms a valve actuating cam for valve actuation and/or defines the valve actuation. A "mechanical displacement element" is in this case understood in particular to mean an element of a switching unit which is provided for axially displacing a different element, such as in particular the cam element, and which does not have a separate actuator for generating a displacement movement, but instead is driven by a coupling to a self-moving component of the valve train device, such as in particular the cam element or the camshaft. A "switching unit" is understood in particular to mean a unit which is provided to axially displace the at least one cam element on the camshaft. An "interaction with just one contour" is in this case understood in particular to mean that the mechanical displacement element only comes into contact with a single contour in order to shift the cam element, with the valve train device in particular not comprising a second contour with which the mechanical displacement element engages in order to generate a displacement movement.

A "contour of the cam element" is in this case understood in particular to mean a shaped portion of the cam element which is provided to form-fittingly and/or frictionally contact a displacement element at least in order to switch the cam element.

It is also proposed that the mechanical displacement element interacting with the single contour of the cam element is provided to cause at least one axial component of the movement of the mechanical displacement element. As a result, the displacement element can particularly advantageously actuate the cam element. An "axial component of the movement" is in this case understood in particular to mean a component of a movement of the mechanical displacement element, which component is produced by contact with the cam element and is oriented in parallel with a rotational axis of the camshaft.

It is also proposed that a form fit between the mechanical displacement element and the cam element is provided to cause a switching movement of the cam element. As a result, the cam element can be particularly simply switched between the at least two cam tracks thereof. A "switching movement of the cam element" is in this case understood in particular to mean a movement of the cam element parallel to the rotational axis of the camshaft, in which movement the cam element is displaced on the camshaft, a switching movement causing an axial movement of the cam element by the width of a cam track of the cam element.

It is also proposed that the mechanical displacement element is designed as a gearwheel. As a result, the displacement element can be designed in a particularly advantageous manner.

Moreover, it is proposed that the displacement element is mounted so as to be rotatable about an eccentric shaft. As a result, the displacement element can be moved relative to the camshaft in a particularly simple manner. An "eccentric shaft" is in this case understood in particular to mean a shaft which is displaced outwards toward a central axis of the displacement element which is designed as a gearwheel.

It is also proposed that the displacement element is arranged so as to be radially displaceable toward the camshaft. As a result, the displacement element can be brought into contact with and separated from the cam element in a simple manner, as a result of which the switching unit for shifting the cam element can be designed in a particularly simple manner.

It is also proposed that the valve train device has an eccentric bearing element about which the displacement element is rotatably mounted. As a result, the displacement element can be eccentrically mounted in a particularly simple manner.

It is also proposed that the contour of the cam element is designed as teeth that do not have an axial incline. As a result, the contour of the cam element can be designed in a particularly simple manner.

It is also proposed that the valve train device comprises at least one transmission element that is coupled to the displacement element and can be shifted radially toward the camshaft between an engagement position and a neutral position. As a result, a movement of the displacement element relative to the camshaft in a switching process can be particularly advantageously transmitted to the cam element.

It is also proposed that the transmission element is connected to the displacement element so as to be fixed in the axial direction and displaceable in the radial direction. As a result, an axial movement of the displacement element during an eccentric rotation can advantageously be transmitted to the cam element, whereas a radial movement of the cam element is compensated.

Further advantages can be found in the following description of the drawings. An exemplary embodiment of the invention is shown in the drawings. The drawings, the description of the drawings and the claims contain numerous features in combination. A person skilled in the art will expediently also consider the features individually and combine them to form meaningful further combinations.

DETAILED DESCRIPTION OF THE DRAWINGS

Figure 1:
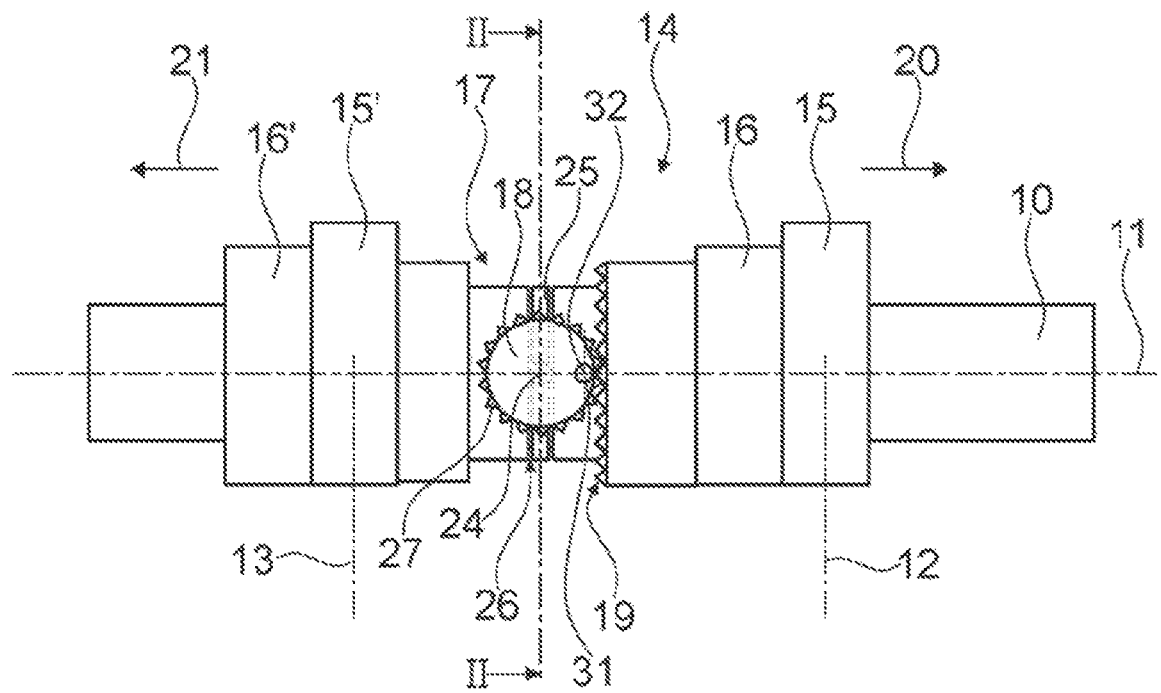
FIG. 1 is a schematic view of a valve train device according to the invention comprising a switching unit and comprising a cam element in a first switching position.
Figure 2:
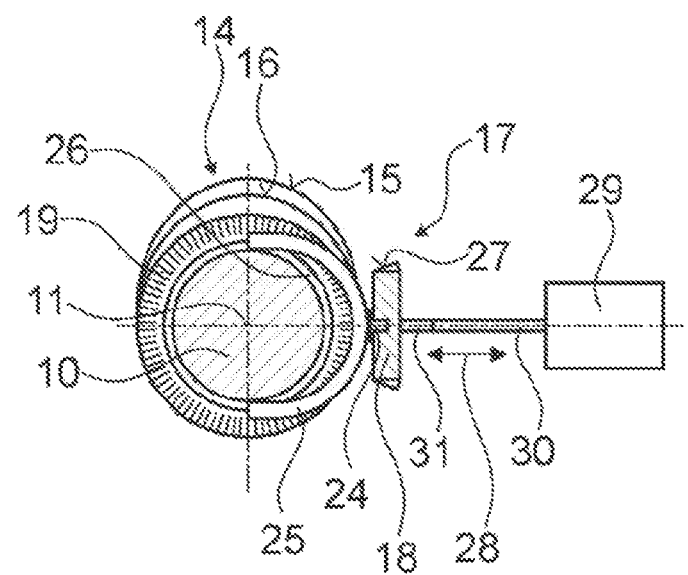
FIG. 2 is a schematic sectional view through the camshaft and the switching unit.
Figure 3:
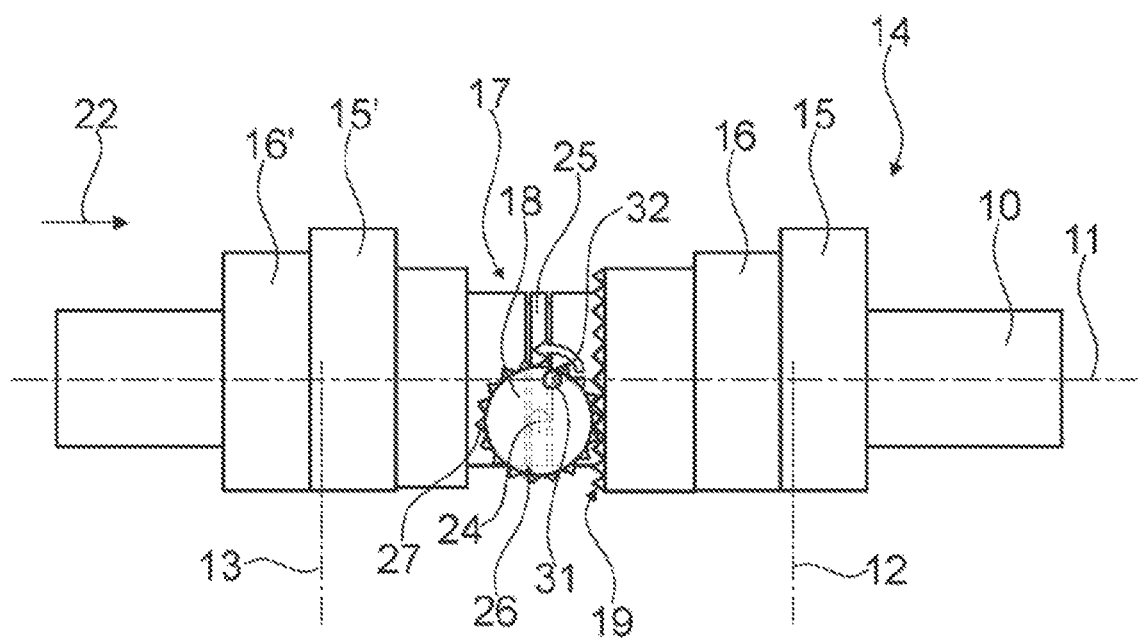
FIG. 3 is a schematic view of the valve train device during a first switching movement of the cam element.

FIGS. 1 to 5 show an embodiment of a valve train device according to the invention. The valve train device is part of an internal combustion engine which is not shown in greater detail. The internal combustion engine is in the form of a motor vehicle internal combustion engine which is provided to convert chemical energy into kinetic energy which is used in particular to propel a motor vehicle. In this case the internal combustion engine has a plurality of cylinders each comprising a plurality of valves 12, 13. The internal combustion engine has two valves 12, 13 which are designed as intake valves and two valves which are designed as outlet valves. In principle it is also conceivable for the internal combustion engine to have a different number of valves 12, 13. The valves 12, 13 are in this case shown schematically through the actuation plane thereof in FIGS. 1 and 3 to 5.

The valve train device is provided for actuating the valves 12, 13 of the internal combustion engine. The valve train device has a camshaft 10 for actuating the valves 12, 13. Each of the Figures only shows one part of the camshaft 10 that is associated with a cylinder. The valve train device also has a further camshaft which is not shown in greater detail. The camshaft 10 shown is in this case designed by way of example as an intake camshaft, and the camshaft that is not shown in greater detail is designed as an outlet camshaft. Only the part of the camshaft 10 that is described in the Figures is described in greater detail in the following. The description can be applied to the part of the camshaft 10 that is not shown in greater detail and to the camshaft that is not shown in greater detail.

The camshaft 10 is rotatably mounted in a valve train housing which is not shown in greater detail. The camshaft 10 is in this case mounted so as to be rotatable about a rotational axis 11. The rotational axis 11 of the camshaft 10 is in this case oriented substantially in parallel with a rotational axis of a crankshaft of the internal combustion engine. The camshaft 10 is driven by means of a coupling of the crankshaft, which coupling is not shown in greater detail. The valve train device comprises one cam element 14 per cylinder. In principle it is also conceivable for the valve train device to have a different number of cam elements 14 per cylinder. The cam element 14 is arranged on the camshaft 10 so as to be axially displaceable. In this case the cam element 14 is coupled to the camshaft 10 for conjoint rotation. The cam element 14 is in this case connected to the camshaft 10 in particular by means of teeth which are not shown in greater detail. The cam element 14 is provided for actuating the valves 12, 13. For this purpose, the cam element 14 has two cam tracks 15, 15', 16, 16' per valve 12, 13. In principle it is also conceivable for the cam element 14 to have three or more than three cam tracks 15, 15', 16, 16' per valve 12, 13. The cam tracks 15, 15', 16, 16' each have different contours and therefore actuate the relevant valve 12, 13 that has correspondingly different valve strokes. When the cam element 14 is in a first switching position, the first cam tracks 15, 15' actuate the relevant valve 12, 13. The first switching position of the cam element 14 is in this case shown in FIG. 1. When the cam element 14 is in a second switching position, the second cam tracks 16, 16' actuate the relevant valve 12, 13. The second switching position of the cam element 14 is in this case shown in FIG. 4. A valve 12, 13 is actuated by a cam track 15, 15', 16, 16' in a manner known to a person skilled in the art.

In order to shift the cam element 14 on the camshaft 10 between the two switching positions, the valve train device has a switching unit 17. The switching unit 17 is provided to axially displace the cam element 14 on the camshaft 10 in order to bring the different cam tracks 15, 15', 16, 16' into engagement with the relevant valve 12, 13. The switching unit 17 is provided to switch the cam element 14 in a first axial direction 20 and in a second axial direction 21. In order to displace the cam element 14 from a first switching position, in which the cam tracks 15, 15' are engaged with the relevant valve 12, 13, into the second switching position, in which the cam tracks 16, 16' are engaged with the relevant valve 12, 13, the cam element 14 is displaced in the first axial direction 20 in a first switching movement 22 by means of the switching unit 17. In order to displace the cam element 14 from a second switching position, in which the cam tracks 16, 16' are engaged with the relevant valve 12, 13, into the first switching position, in which the cam tracks 15, 15' are engaged with the relevant valve 12, 13, the cam element 14 is displaced in the second axial direction 21 in a second switching movement 23 by means of the switching unit 17.

The switching unit 17 has a mechanical displacement element 18 which is provided for axially displacing the cam element 14 on the camshaft 10. The cam element 14 comprises a contour 19 which is provided to contact the mechanical displacement element 18 in order to shift the cam element 14. The contour 19 is formed by the cam element 14. The displacement element 18 is provided to only come in contact with the contour 19 of the cam element 14 in order to displace the cam element 14. The mechanical displacement element 18 is provided to move the cam element 14 in the first axial direction 20 and the second axial direction 21 by interacting with the single contour 19 of the cam element 14. In order to displace the cam element in the two axial directions 20, 21, the mechanical displacement element 18 does not particularly require two different contours of the cam element 14 for each one of the axial directions 20, 21. In order to generate a displacement movement in the first axial direction 20, the mechanical displacement element 18 interacts with the single contour 19 of the cam element 14. In order to generate a displacement movement in the second axial direction 21, the mechanical displacement element 18 interacts with the single contour 19 of the cam element 14. In so doing, an axial component of a movement of the mechanical displacement element 18, and consequently a switching movement 22, 23 of the cam element 14, is caused by the mechanical displacement element 18 interacting with the contour 19 of the cam element 14. In so doing, a form fit between the mechanical displacement element 18 and the contour 19 of the cam element 14 causes the switching movement 22, 23 of the cam element 14. During a switching process of the switching unit 17, in which process the cam element 14 carries out one of the switching movements 22, 23, the mechanical displacement element 18 is in form-fitting contact with the contour 19 of the cam element 14. In one operating state, in which the cam element 14 is not displaced, the valves 12, 13 are constantly actuated by one of the cam tracks 15, 16, 15', 16', and the mechanical displacement element 18 is separated from the single contour 19 of the cam element 14.

The mechanical displacement element 18 is designed as a gearwheel. The mechanical displacement element 18 in this case comprises spur gearing 27 which is provided to engage in the contour 19 of the cam element 14 in order to displace the cam element 14. For this purpose, the contour 19 of the cam element 14 is designed as teeth that do not have an axial incline. The contour 19 which is designed as teeth is in this case attached to a lateral face of the cam element 14 that is orthogonal to the rotational axis 11 of the camshaft 10. In this case, the contour 19 is arranged in particular on a lateral face of the cam element 14, which face is designed as a part of the cam element 14 that forms the cam tracks 15, 16 for actuating the one valve 12, and which is opposite a part of the cam element 14 that forms the cam tracks 15', 16' that actuate the valve 13. As a result, the switching unit 17 is advantageously arranged in a region between the two valves 12, 13, in which region the cam tracks 15, 16, 15', 16' are arranged so as to be spaced apart from one another in order to actuate the different valves 12, 13. As a result, axial installation space can advantageously be used efficiently.

The switching unit 17 comprises a transmission element 24. A first end of the transmission element 24 is coupled to the mechanical displacement element 18. In this case, the first end of the transmission element 24 is mounted so as to be axially fixed and so as to be displaceable in the radial direction of the displacement element 18. A second end of the transmission element 24 forms a form-fitting element 25 which is provided for form-fittingly coupling to the cam element 14. The form-fitting element 25 is in this case forked, and provided to engage the cam element 14 at least in part for form-fitting connection.

The cam element 14 comprises a correspondingly designed form-fitting element 26 in order to couple to the transmission element 24. The form-fitting element 26 of the cam element 14 is in this case designed as a circumferential groove. In principle it is also conceivable for the form-fitting element 26 to be designed in a different manner that appears expedient to a person skilled in the art, for example as a circumferential rib, with the corresponding form-fitting element 25 of the transmission element 24 being equivalently designed.

The mechanical displacement element 18 and the transmission element 24 are together arranged in a switching axis 28 so as to be displaceable between a first switching position and a second switching position. The switching axis 28 in this case extends in the radial direction of the camshaft 10. As a result, the displacement element 18 and the transmission element 24 can be moved radially toward the camshaft 10 and the cam element 14 and away from the camshaft 10 and the cam element 14.

The first switching position is designed as a neutral position in which the displacement element 18 and the transmission element 24 are remote from the cam element 14. In the first switching position, the displacement element 18 does not engage in the contour 19 of the cam element 14 and there is no form-fitting connection between the form-fitting element 25 of the transmission element 24 and the form-fitting element 26 of the cam element 14. In the first switching position, the cam element 14 is not displaced and the valves 12, 13 are each constantly actuated by one of the cam tracks 15, 16, 15', 16'.

The second switching position is designed as an engagement position in which the displacement element 18 and the transmission element 24 correspondingly contact the cam element 14. In the second switching position, the displacement element 18 and the transmission element 24 are moved radially toward the cam element 14. In the second switching position, the displacement element 18 engages in the contour 19 of the cam element 14 and there is a form-fitting connection between the form-fitting element 25 of the transmission element 24 and the form-fitting element 26 of the cam element 14. As a result, when the displacement element 18 and the transmission element 24 are in the second switching position, the cam element 14 is shifted into the first or second switching position thereof by a switching movement 22, 23 in accordance with the current switching position of the cam element 14.

In order to shift the displacement element 18 and the transmission element 24, the switching unit has an actuator 29. The actuator 29 has an actuating piston 30 which can be displaced in an axial direction and can be axially displaced between a retracted position and an extended position. The retracted position in this case corresponds to the first switching position of the displacement element 18 and the transmission element 24. The extended position corresponds to the second switching position of the displacement element 18 and the transmission element 24. The actuator 29 is in this case designed as an actuator that can be electrically controlled and has an electric motor and a spindle drive, by means of which the actuating piston can be axially displaced. In principle it is also conceivable for the actuator to be designed as a different actuator that appears expedient to a person skilled in the art, such as a pneumatic or hydraulic actuator.

The mechanical displacement element 18, which is designed as a gearwheel, is mounted about an eccentric shaft 32. For this purpose, the switching unit 17 comprises an eccentric bearing element 31 by means of which the mechanical displacement element 18, which is designed as a gearwheel, is rotatably mounted. The eccentric bearing element 31 is in this case arranged in a plane comprising the rotational axis 11 of the camshaft 10. The eccentric bearing element 31 is in this case arranged so as to be fixed to the housing. The eccentric bearing element 31 is coupled to the actuating piston 30 of the actuator 29. The displacement element 18 and consequently the transmission element 24 can be axially displaced in the switching axis 28 by means of the hearing element 31 and the actuating piston 30 of the actuator 29. On account of the eccentric bearing element 31, the displacement element 18 that is designed as a gearwheel does not rotate about the center point thereof, but instead rotates about an eccentric shaft which forms the eccentric bearing element 31. On account of the eccentric bearing element 31, the mechanical displacement element 18 that is designed as a gearwheel moves relative to the camshaft during rotation. By simultaneously coupling the displacement element 18 to the cam element 14 by means of the transmission element 24, the cam element 14 is displaced in one of the axial directions 20, 21 by an axial component of a movement of the displacement element 18 during rotation thereof. During a rotation of the displacement element 18 about the eccentric bearing element 31, the bearing axis travels along the plane of the rotational axis 11 of the camshaft 10 in an axial direction between two maximum positions which each represent one of the two switching positions of the cam element 14. In the maximum positions, the center point of the mechanical displacement element 18, on which the transmission element 24 is also connected to the displacement element 18, is in each case likewise arranged on the plane of the rotational axis 11 and on the bearing element 31.

Figure 4:
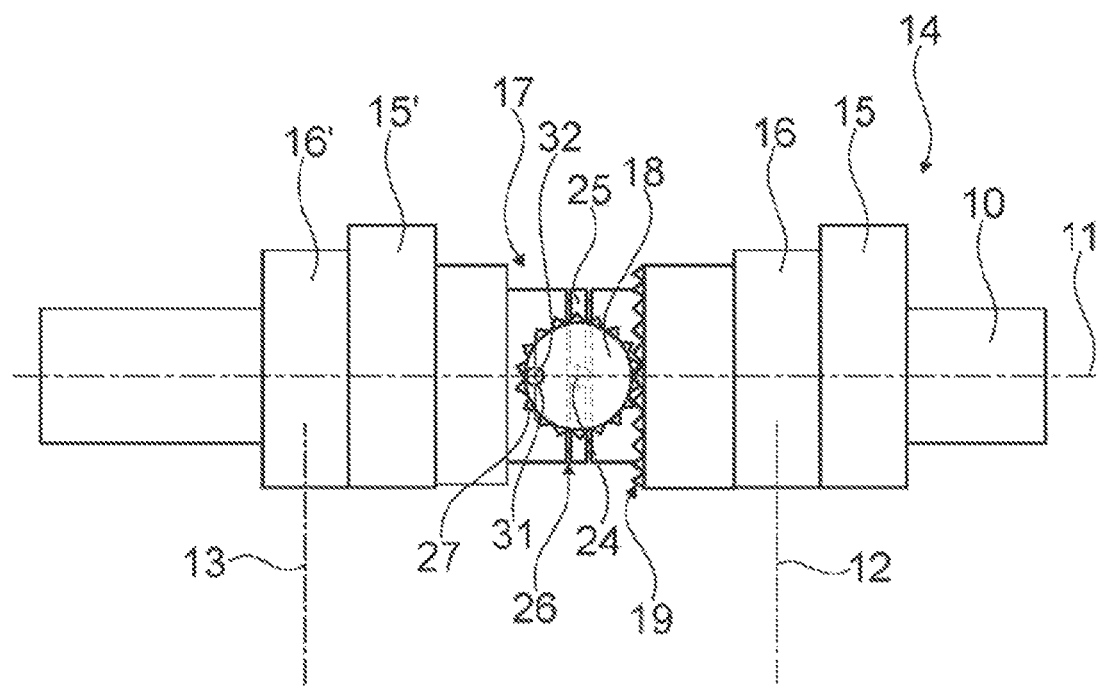
FIG. 4 is a schematic view of the valve train device comprising a switching unit and comprising a cam element in a second switching position.
Figure 5:
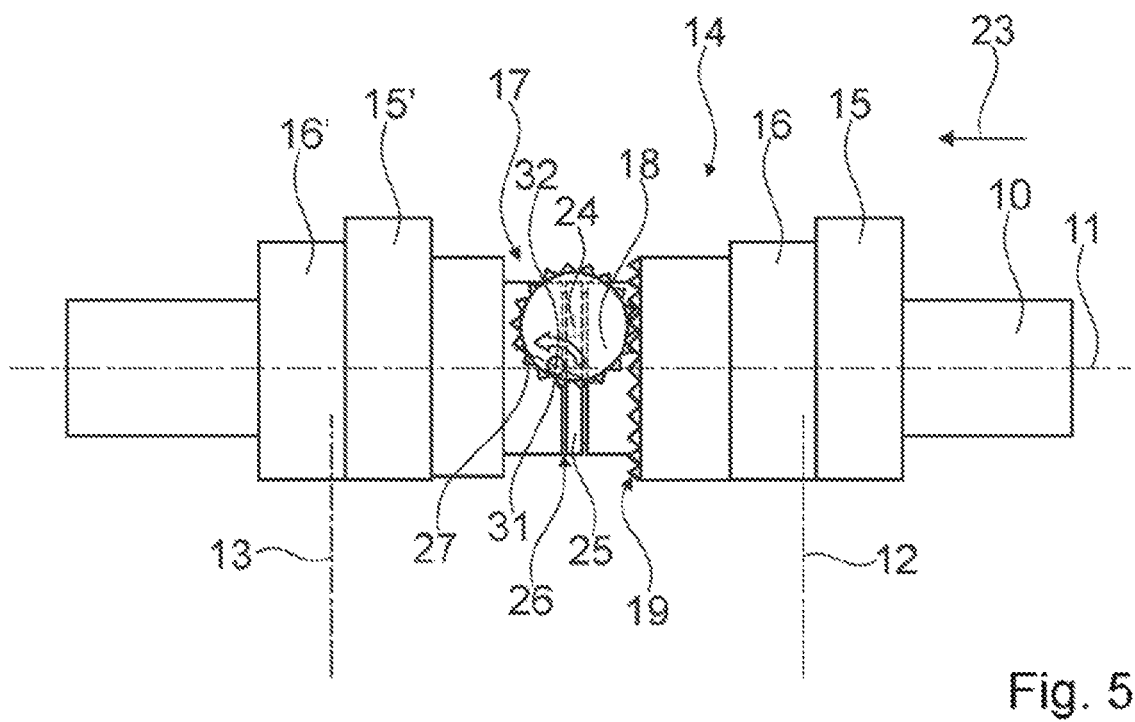
FIG. 5 is a schematic view of the valve train device during a second switching movement of the cam element.

FIG. 1 shows a first switching position of the cam element 14. The cam tracks 15, 15' are engaged with the corresponding valve 12, 13. The mechanical displacement element 18 and the transmission element 24 are switched into the first switching position thereof, which is designed as a neutral position, by means of the actuator 29. The eccentric bearing element 31 faces the first maximum position thereof and the cam tracks 15, 16. In the neutral position, the mechanical displacement element 18 does not rotate. In order to switch the cam element 14 into the second switching position, the mechanical displacement element 18 and the transmission element 24 are switched into the second switching position thereof, which is designed as an engagement position, by means of the actuator 29. The transmission element 24 comes into form-fitting contact with the form-fitting element 26 of the cam element and the spur gearing 27 of the displacement element 18 meshes in the contour 19 of the cam element 14 that is designed as teeth. On account of the interaction between the contour 19 of the cam element 14 and the mechanical displacement element 18, the displacement element 18 is driven by the rotation of the cam element 14 and rotates about the eccentric bearing element 31. The displacement element 18 moves relative to the camshaft on account of the eccentric hearing by means of the eccentric hearing element 31. In this case, the movement of the displacement element 18 relative to the camshaft 10 has an axial component and a radial component. The axial component of the movement causes, on account of the form-fitting coupling between the cam element 14 and the transmission element 24, an axial displacement of the cam element 14 in the first axial direction 22, and therefore displaces an engagement of the valves 12, 13 from the first cam track 15, 15' onto the second cam track 16, 16'. The first switching movement 22 is completed once the center point of the displacement element 18 has come back onto the plane of the rotational axis 11 and of the bearing element 31, and the eccentric bearing element 31, in the second maximum position thereof, in this case faces the cam tracks 15', 16'. When the displacement element 18 has arrived in this position, the displacement element 18 and the transmission element 24 are switched back into the first switching position thereof, which is designed as a neutral position, by the actuator 29. The cam element 14 therefore remains in the second switching position. FIG. 4 shows the cam element 14 in the second switching position.

In order to switch the cam element 14 from the second switching position into the first switching position, the mechanical displacement element 18 and the transmission element 24 are switched into the second switching position thereof, which is designed as an engagement position, by means of the actuator 29. The transmission element 24 comes into form-fitting contact with the form-fitting element 26 of the cam element 14 and the spur gearing 27 of the displacement element 18 meshes in the contour 19 of the cam element 14 that is designed as teeth. On account of the interaction between the contour 19 of the cam element 14 and the mechanical displacement element 18, the displacement element 18 is driven by the rotation of the cam element 14 and rotates about the eccentric hearing element 31. The eccentric bearing element 31 in this case moves back toward the first maximum position thereof, in which it faces the cam tracks 15, 16, as a result of which the cam element 14 carries out its second switching movement 23 in the second axial direction.

In principle it would also be conceivable for the cam element 14 to have more than three cam tracks in each case, as a result of which the displacement element 18 and the transmission element 24 would be demeshed not only when the eccentric bearing element 31 is in the maximum positions in order to provide the further switching positions.

The invention claimed is:

1. A valve train device, comprising:
a camshaft;
a cam element that is axially displaceable on the camshaft; and
a mechanical displacement element, wherein the cam element is axially displaceable on the camshaft by the mechanical displacement element;
wherein the mechanical displacement element axially displaces the cam element in a first axial direction and a second axial direction by interacting with just one single contour of the cam element;
wherein the mechanical displacement element interacts with the single contour of the cam element to cause an axial component of a movement of the mechanical displacement element;
wherein a form fit between the mechanical displacement element and the cam element causes a switching movement of the cam element;
and wherein the mechanical displacement element only comes into contact with the single contour of the cam element in order to axially displace the cam element.

2. The valve train device according to claim 1, wherein the mechanical displacement element is a gearwheel.

3. The valve train device according to claim 1, wherein the mechanical displacement element is rotatable about an eccentric shaft.

4. The valve train device according to claim 1, wherein the mechanical displacement element is radially displaceable toward the camshaft.

5. The valve train device according to claim 1 further comprising an eccentric bearing element about which the mechanical displacement element is rotatably mounted.

6. The valve train device according to claim 1, wherein the single contour of the cam element is teeth that do not have an axial incline.

7. The valve train device according to claim 1 further comprising a transmission element that is coupled to the mechanical displacement element and is shiftable radially toward the camshaft between an engagement position and a neutral position.

8. The valve train device according to claim 7, wherein the transmission element is connected to the mechanical displacement element so as to be fixed in the axial direction and so as to be displaceable in a radial direction.

* * * * *